United States Patent
Hsu

(10) Patent No.: US 7,421,202 B2
(45) Date of Patent: Sep. 2, 2008

(54) PHOTONIC LABEL SWITCHING ARCHITECTURE

(75) Inventor: Dar-Zu Hsu, Tainan (TW)

(73) Assignee: Industrial Technology Research Institute (TW)

( * ) Notice: Subject to any disclaimer, the term of this patent is extended or adjusted under 35 U.S.C. 154(b) by 563 days.

(21) Appl. No.: 10/305,021

(22) Filed: Nov. 27, 2002

(65) Prior Publication Data

US 2004/0033074 A1    Feb. 19, 2004

(30) Foreign Application Priority Data

Aug. 9, 2002    (TW) .............................. 91117958 A

(51) Int. Cl.
*H04J 14/00*    (2006.01)
(52) U.S. Cl. .......................................... 398/54; 398/77
(58) Field of Classification Search ................. 398/77, 398/54, 51
See application file for complete search history.

(56) References Cited

U.S. PATENT DOCUMENTS

| | | | | |
|---|---|---|---|---|
| 5,111,322 A | * | 5/1992 | Bergano et al. | 398/74 |
| 6,559,989 B1 | * | 5/2003 | Kim et al. | 398/101 |
| 7,035,247 B2 | * | 4/2006 | Ofek et al. | 370/350 |

OTHER PUBLICATIONS

Hideyuki Sotobyashi, Wataru Chujo, Ken-ichi Kitayama (IEEE Journal of selected topics in quantum electronics vol. 8, No. 3, "Transparent Virtual Optical Code/Wavelength Path Network" May/Jun. 2002 p. 699-703).*

Ken-ichi Kitayama (IEEE Photonics Technology letters, vol. 11 No. 12, "Photonic IP Routing," Dec. 1999 p. 1689-1691).*

Ken-ichi Kitayama (IEEE Journal on Selected areas in Communications, vol. 16, No. 7, "Code Division Multiplexing Lightwave Networks Based upon Optical Code Conversion," Sep. 1998 p. 1309-1319).*

Ken-ichi Kitayama, Naota Wada, Hideki Sotobayashi (Journal of Lightwave Technology, vol. 18 No. 12, "Architectural Considerations for Photonic IP Router Based upon Optical Code Correlation" Dec. 2000 p. 1834-1844).*

Min-Cheol Oh, Myung-Hyun Lee, and Hyung-Juong Lee (IEEE Photonics Technology Letters vol. 11 No. 9 "Polymeric Waveguide Polarization Splitter with a Buried Birefringent Polymer" Sep. 1999 p. 1144-1146).*

Masayuki Murata, Ken-ichi Kitayama (IEEE Network "A perspective on Photonic Multiprotocol Label Switching," Jul./Aug. 2001 p. 56-63).*

Rosen et al, RFC-3031, "Multiprotocol Label Switching Architecture", Jan. 2001.*

I. Ogura et al., "Demonstration of All-Optical Clock Recovery and Demultiplexing with a Simple-Geometry Utilizing Mode-Locked Laser Diodes", ECOC 97, Sep. 22-25, 1997.*

* cited by examiner

*Primary Examiner*—Shi K Li
(74) *Attorney, Agent, or Firm*—Birch, Stewart, Kolasch & Birch, LLP

(57) ABSTRACT

A photonic label switching architecture. The architecture includes a photonic label extractor to split an externally input first optical packet data into a photonic label and a payload. Then, the photonic label is input to a photonic label processing and swapping device to duplicate as a plurality of parallel copies for decoding and producing an auto-correlation output. According to the auto-correlation output, a photonic label swapping path is chosen, a new photonic label is produced, and an output port of an optical switch is chosen. A new optical packet data which is the result of the new photonic label adjoining the payload is output to the chosen output port of the optical switch.

15 Claims, 7 Drawing Sheets

PHOTONIC LABEL SWITCHING ARCHITECTURE

BACKGROUND OF THE INVENTION

1. Field of the Invention

The invention relates to a photonic label switching architecture, using an optical code correlation technique to replace photonic labels in the optical packet and handle the fully photonic label switching through the features of auto-correlation and cross-correlation, thereby omitting the photoelectric conversion for a photonic label.

2. Description of Related Art

The demand for enormous transmission capacity through optical fiber has been met so far by the wide scale deployment of wavelength division multiplexing (WDM). A direct mapping of Internet protocol (IP) onto the optical layer will eventually simplify the protocol architecture, to minimize the transfer delay in the core network. Further, to manage and access this bandwidth, the next growing challenge will most likely emerge at the switching nodes. The eventual goal is to reduce the amount of complex electronic components, and the cost, by migrating to the all-optical network, where data is switched and routed transparently in optical form. An optical packet switched network can provide high performance and fast switching with fine granularity for future networks. Photonic packet header processing for routing and switching will be needed to increase throughput and reduce latency. However, the processing capability of electronic routers will eventually result in bottlenecks in the foreseeable future, due to the explosion of IP traffic. Accordingly, one promising way to alleviate the capacity limit of the routers is to introduce a Multi-Protocol Label Switching (MPLS) technology.

FIG. 1 is a schematic diagram of a typical MPLS network. In FIG. 1, the network is formed by label switching router (LSR), e.g. LSR1-LSR5 where LSR1 is an ingress LSR and LSR5 is an egress LSR. As shown in FIG. 1, the solid line indicates a path between LSRs and its routing protocol and label distribution protocol, and the dotted line indicates label switching traffic flow. The principle function of MPLS is to utilize a label swapping forwarding algorithm to achieve the high-speed packet forwarding capability. It provides a label-steam which means mapping IP address to simple, fixed-length labels used by different packet forwarding and packet-switching technologies. Header processing and forwarding of IP packets are necessary at every router. This label can be used to save significant processing time by avoiding network layer label analysis at each hop and soaring processing demands at each network node. Moreover, the high-speed switching of data is possible because the fixed-length label is inserted at the beginning of the packet and can be processed by hardware through LSR1 and LSR53. Thus, switching packets can be very quick between links. MPLS routers use this kind of simple label-swapping algorithm replacing the standard destination-based hop-by-hop forwarding paradigm to quickly forward packets and enable scaling to terabit rates easily. Therefore, MPLS network can be well suited to the photonic-based network in which high-speed transmission is required. Here, it is referred to as photonic MPLS. A recent photonic MPLS is mainly devoted to wavelength MPLS network where the WDM technology is applied. When the logical topology of the wavelength MPLS network is established, the label switching paths (wavelength paths or light paths) are configured over the WDM physical network in order to carry IP packets utilizing the wavelength path. Here, the physical network describes an actual network which is similar to the network showed in FIG. 1. But the nodes are optical nodes and links connecting nodes are optical links. The LSRs in FIG. 1 are generally able to perform various operations on packet labels. However, it has been difficult to realize those functions in optical domain, i.e. for example, the wavelength MPLS network. Only one exception is label swapping changing the incoming wavelength to the different wavelength at the optical cross-connect switch. However, a high-speed wavelength conversion is difficult to perform on a packet-by-packet basis by the current technology. Therefore, functionalities of the core LSR are very limited in the wavelength MPLS network. To solve this problem, the light paths have to be set up in a circuit-switched fashion between ingress/egress LSRs. However, the bandwidth utilization of light paths will thus become very inefficient due to the photoelectric conversion delay. Additionally, the packet switching speed is limited by the photoelectric conversion, because the photonic header of a packet switching configured by the WDM technology has to be processed in electrical domain.

SUMMARY OF THE INVENTION

Accordingly, an object of the invention is to provide a photonic label switching architecture, using an optical code division multiplexing (OCDM) to configure photonic label switching so as to process the photonic label in all optical domain without the photoelectric conversion. Thus, the processing capability and speed of photonic label is increased.

Another object of the invention is to provide a photonic label switching architecture, which configures photonic header based on OCDM technology. By this way, roouting and switching can be implemented in photonic form, thereby increasing the throughput and reducing the latency.

The invention provides a photonic label switching architecture. The architecture includes a photonic label generator in an ingress LSR and a photonic label extractor, a photonic label processor, optical swappers, optical switches and an optical coupler in a core LSR. The photonic label generator includes an optical polarization controller and optical encoders. The optical polarization controller polarizes the lights of photonic label and payload in an optical packet to orthogonal TE and TM modes. The optical encoders receive the TE mode's light and encode the light to be a desired photonic label. In the core LSR, the photonic label extractor splits the received optical packet into photonic label and optical payload. The photonic label is directed to the photonic label processor. The photonic label processor includes an optical splitter and an optical correlator having a plurality of optical decoders and a plurality of optical time gate controllers with respect to the optical decoders. The optical splitter duplicates the photonic label as a plurality of parallel copies. The optical decoders match the copies such that only one with an auto-correlation label can pass through the respective optical time gate controller to the photonic label swapper. The photonic label swapper thus produces a new photonic label and configures the respective optical switch to select an output path. The optical coupler re-combines the new photonic label and the optical payload passed through the optical switch as a new optical packet. The new optical packet is output to the selected output path. Therefore, photoelectric conversion in every core LSR is omitted and the processing limitation for the photonic label processing on electrical domain disappears.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

DETAILED DESCRIPTION OF THE INVENTION

The following numbers denote the same elements throughout the description and drawings.

Figure 1:
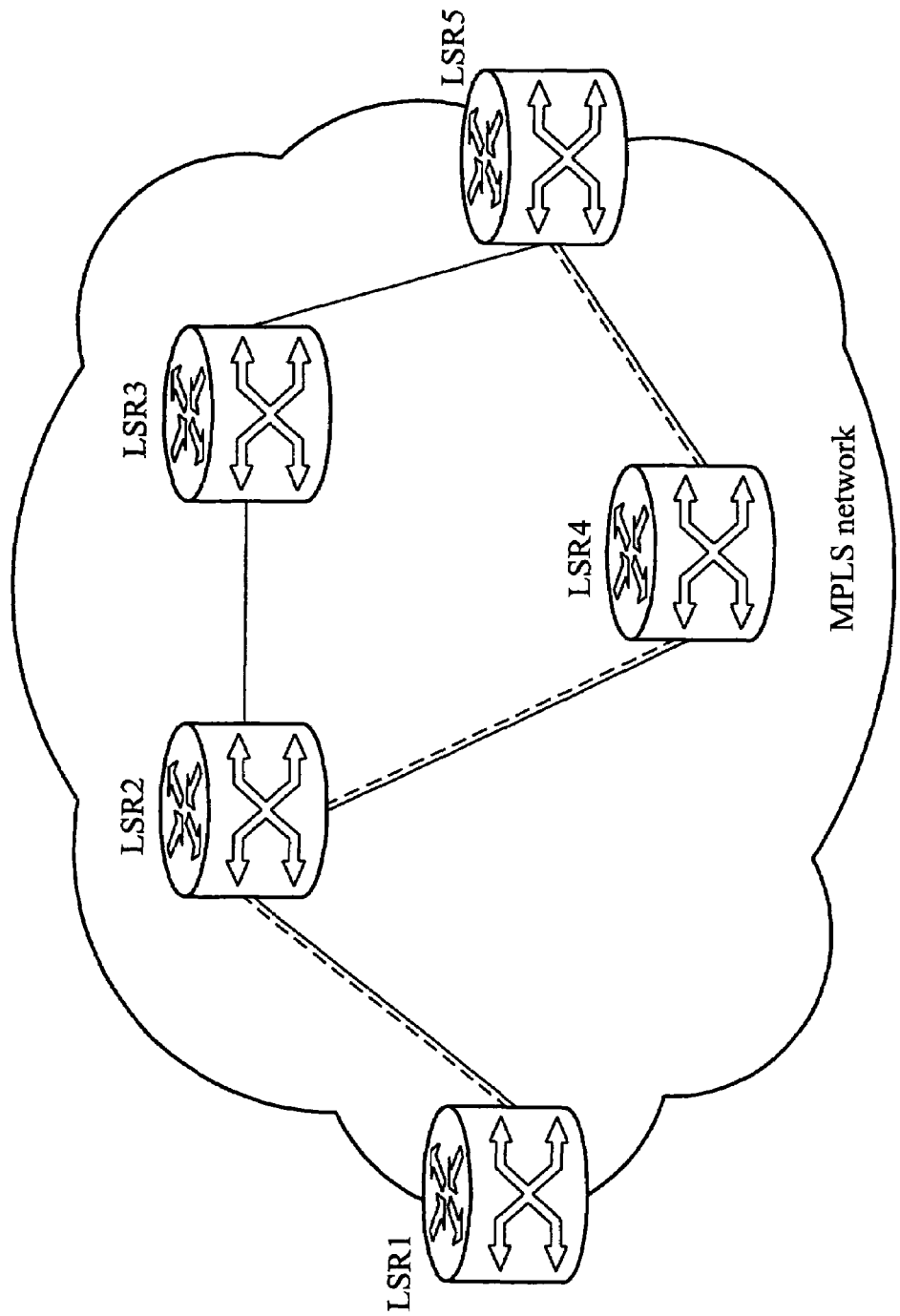
FIG. 1 is a schematic diagram of a typical MPLS network.
Figure 2:
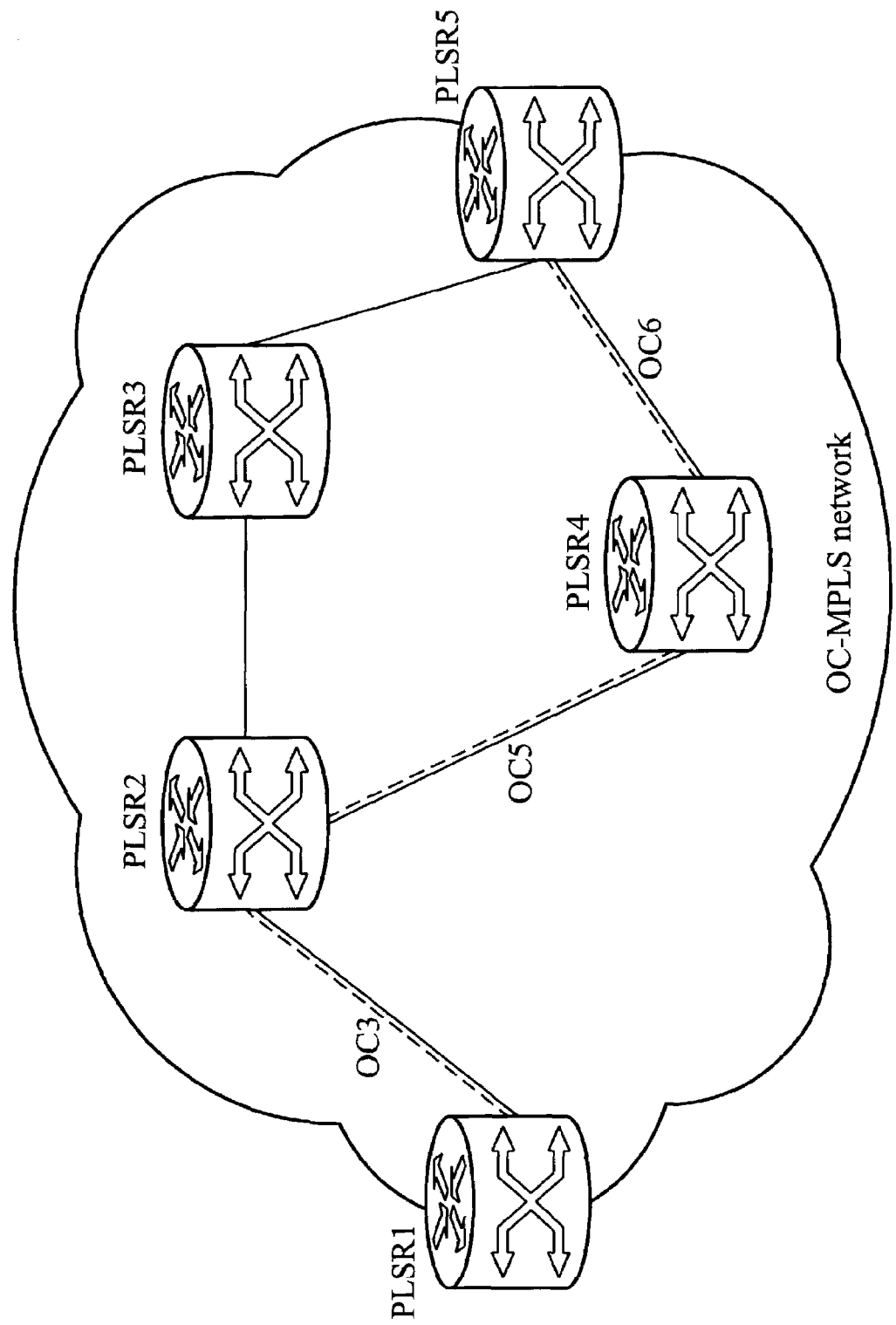
FIG. 2 is a schematic diagram of an MPLS network configured by OCDM technology according to the invention.

FIG. 2 is a schematic diagram of an MPLS network configured by OCDM technology (OC-MPLS network) according to the invention. In FIG. 2, in the OC-MPLS network, electronic LSRs in FIG. 1 are totally replaced with photonic IP routers (referred to as PLSRs) PLSR1-PLSR5 in the core network. Accordingly, the label switching applying in the OC-MPLS network in the packet forwarding algorithm is referred to as the OC-label switching. As shown in FIG. 2, when the WDM signals on a fiber are input to an ingress PLSR1 of the OC-MPLS network, the PLSR1 demultiplexes the input WDM signals and produces optical packets such as OC3, OC5 and OC6. All the packets on the same wavelength are forwarded to a core PLSR to be processed and then directed to an egress PLSR5. The PLSR5 multiplexes all packets and outputs the multiplexed packets through a connected fiber. The processing of IP packets in the PLSR is mainly performed in optical domain without photon-to-electron conversion. Therefore, an all-optical processing is achieved.

Figure 3:
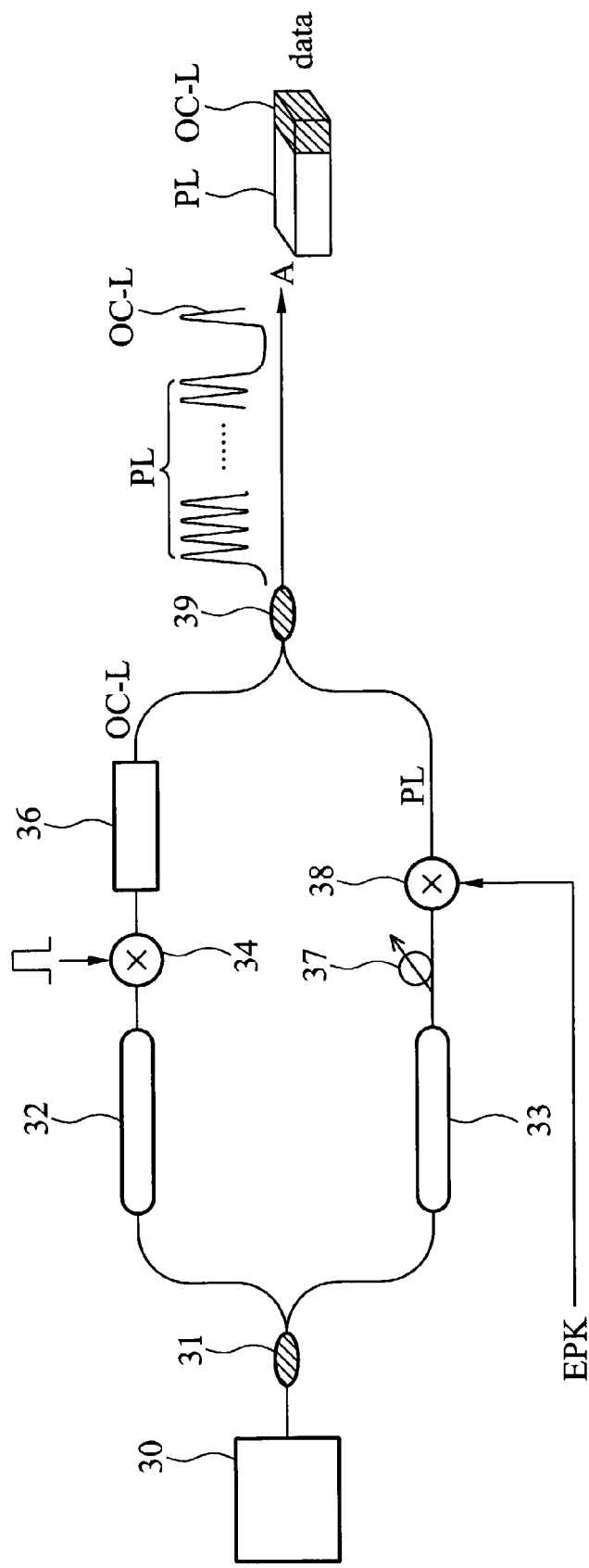
FIG. 3 is a schematic diagram of a photonic label switching router (PLSR) of FIG. 2 according to the invention.

FIG. 3 is a schematic diagram of an ingress PLSR (PLSR1) of FIG. 2 according to the invention. In FIG. 3, the PLSR1 structure includes a laser light source 30, for example a DFB laser, which can provide a continuous wave (CW) and precise wavelength and is suitable for long-haul transmission. The device PLSR1 also includes an optical splitter 31, optical polarization controllers 32, 33, an optical delay device 37, optical modulators 34, 38, an optical encoder 36 and an optical coupler 39. As shown in FIG. 3, a laser light emitted by the light source 30 is equally separated by the splitter 31 into two light beams. The controller 32 polarizes one of the two light beams as a polarized signal TE and the controller 33 polarizes the other as a polarized signal TM. The signals TE and TM are orthogonal. The modulator 34 modulates the signal TE to produce an ultra-short optical pulse stream for the optical encoder 36 to accordingly encode the stream as an optical code label OC-L. The signal TM is delayed by the device 37 (for example, a fiber delay line) an appropriate period of time and output to the modulator 38, which can modulate the signal TM and an external electrical packet EPK to be part of the payload PL of an optical packet. Therefore, the optical coupler 39 can attach the label OC-L in front of the optical payload PL as the desired optical packet. The desired optical packet is output to next PLSR such as PLSR2 through fiber channel (port) A.

Figure 4:
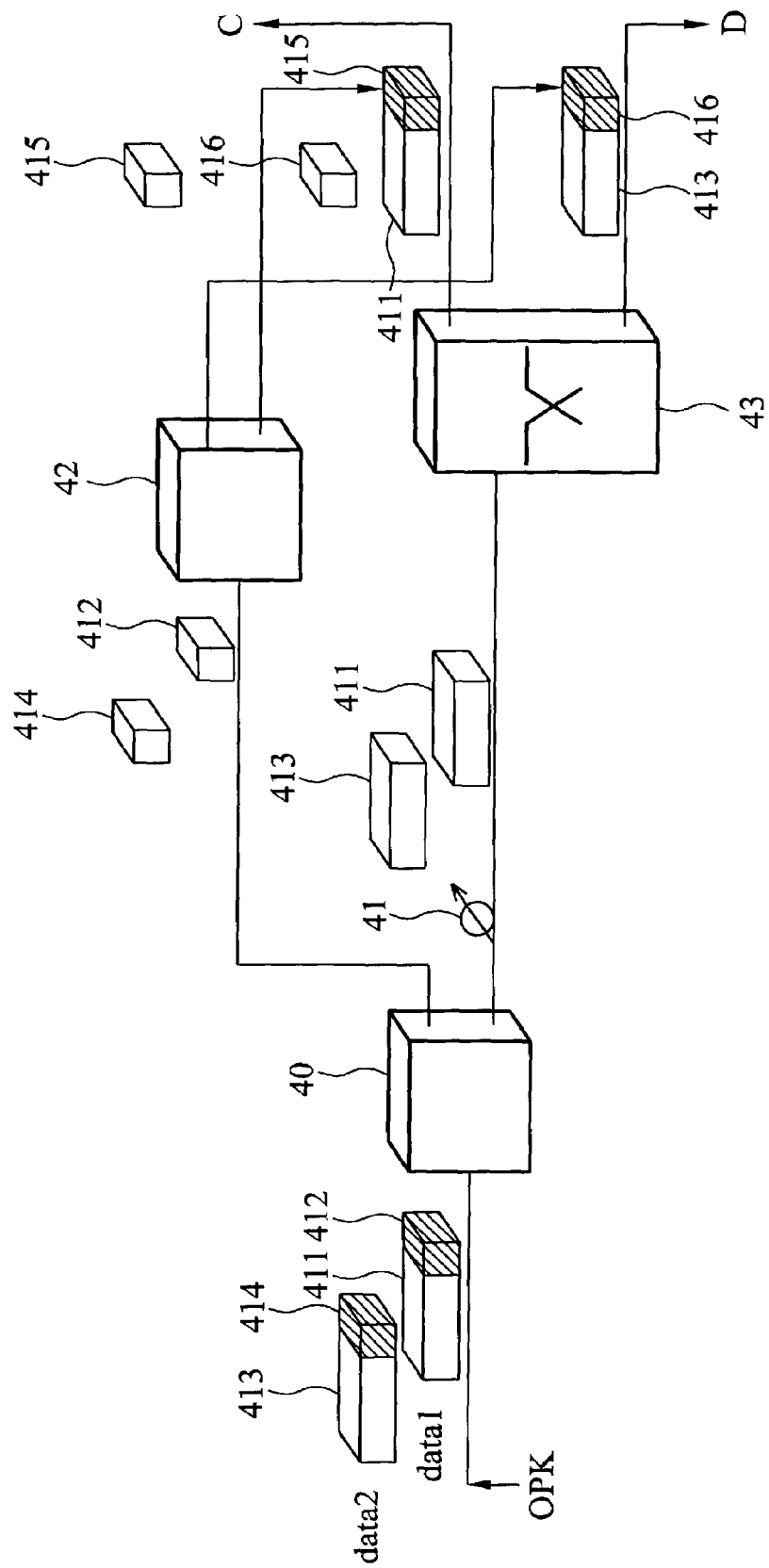
FIG. 4 is a schematic diagram of another PLSR according to the invention.

FIG. 4 is a schematic diagram of another PLSR structure representing any one PLSR except for the ingress PLSR PLSR1 (that is, either the core PLSR PLSR2-PLSR4 or the egress PLSR PLSR5) according to the invention. In FIG. 4, this PLSR structure includes a photonic label extractor 40, a tunable delay device 41, a photonic label processing and swapping device 42 and an optical switch 43. As shown in FIG. 4, when transferring packet data OPK through a port like port A shown in FIG. 3, it is possible to concurrently receive two optical labeled packets data1 and data2 or even more in the port transferred. The photonic label extractor respectively extracts optical labels 412, 414 and optical payloads 411, 413 from the input optical packets data1, data2. The payloads 411, 413 are further delayed for a period of time (about 5 ps) by the device 41 that can be a fiber delay line. Then, the delayed payload is input to the switch 43. Inside the photonic MPLS network, A PLSR performs routing function through an internal routing table. The internal routing table is stored in the device 42 of every PLSR (not shown) except for PLSR1. According to the label 412, 414 extracted by the extractor 40, the routing function can compute new labels 415, 416 with reference to the internal routing table and determine fiber output ports C, D by controlling the switch 43. The routing tables (at egress and core routers) are generated by converting IP addresses into smaller pairs of labels and wavelengths and distributing them across the network much in the same way that MPLS is used in today's IP networks. The extractor 40 can be an optical polarization splitter to extract photonic labels from input packets in which each includes a TE mode for photonic label and a TM mode for optical payload in orthogonal. The optical polarization splitter can use a low-loss polymer waveguide, a briefringent polyimide waveguide or the like (FIG. 5) to control the splitter ratio of the TE mode and the TM mode with very low crosstalk. The device 42 in the PLSR also includes a forwarding function. The forwarding function involves swapping the original label with the new label. That is physically converting the original optical code (i.e. 412, 414) to the new optical code (i.e. 415, 416). Other switching or buffering mechanisms are also configured in the forwarding process. Then, the new labels 415, 416 combine the payload 411 and 413 passed through the switch 43 as new optical packets. The new optical packets are output through the determined fiber output ports C, D. The photonic label processing is described in detail in the following.

Figure 5:
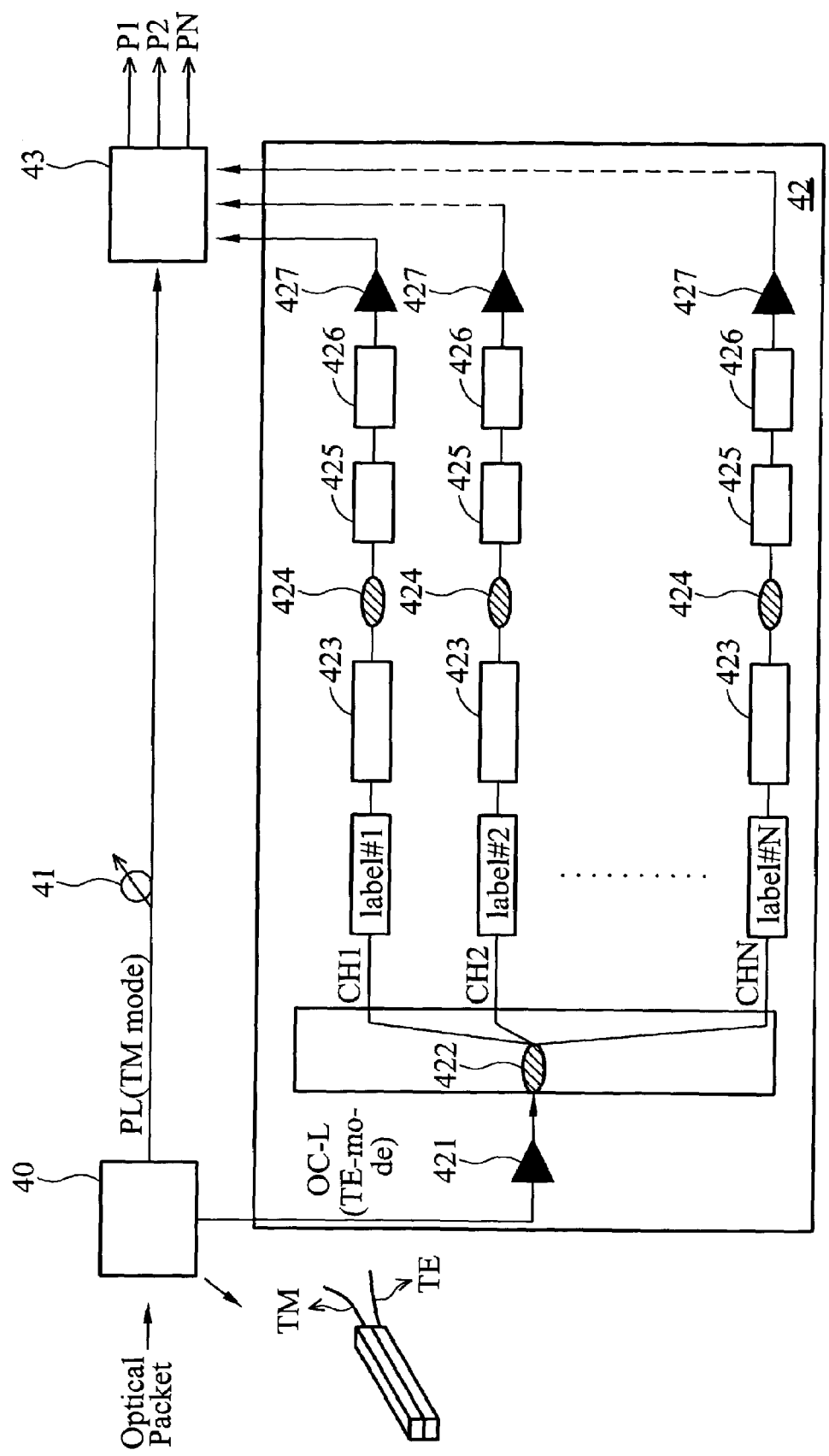
FIG. 5 is a schematic diagram of a photonic label switching architecture according to the invention.

FIG. 5 is a schematic diagram of a parallel photonic label processing architecture according to the invention. In FIG. 5, the architecture is the device 42 in FIG. 4, including an optical amplifier 421, an optical splitter 422, a plurality of optical decoders label#1-label#N, a plurality of optical time gate controllers 423, a plurality of optical swappers 424, a plurality of optical-to-electrical converters 425, a plurality of low-pass filters 426 and a plurality of electrical amplifiers 427, wherein a correlator includes an optical decoder, optical time gate controller, optical swapper, optical-to-electrical converter and electrical amplifier connected in series. As shown in FIG. 5, the label OC-L is extracted by a low-loss polymer waveguide or briefringent polyimide waveguide, amplified by the amplifier 421, duplicated by the splitter 422 to produce many parallel copies, concurrently performed optical correlation comparison and photonic label processing in time domain by corresponding passive optical decoder label#1-label#N through channels CH1-CHN to produce an auto-correlation optical signal output and a plurality of cross-correlation optical signal outputs. Next, only the auto-correlation optical signal (i.e. the photonic label with orthogonal TE mode) output can pass through the controller 423 and filter out its ripples to obtain the unique mainlobe as an optical clock signal OC-Lclock to open the respective controller 4231 and input the OC-Lmain to optical swapper 424 and produce a new optical code label (further described in FIG. 6). The new optical code label (mainlobe) is converted by the following optical-to-electrical converter 425 into an electrical signal, filtered by the low-pass filter 426, amplified by the electrical amplifier 427 and then input to the optical switch 43 to control its path for combination with the payload PL delayed by the delay device 41 by 5 ps. Thus, a packet with a new optical code label (FIG. 4) is produced and output through the following fiber channel (output port) P1, P2, . . . , or PN to next PLSR. Also, the cross-correlation optical signal outputs have only produced ripples (or harmonics), which will filter out by the following filter 426 and no signal is output by the switch 43. The auto-correlation optical signal processing is described with reference to the controller 423 and the switch 424 in the next section.

Figure 6:
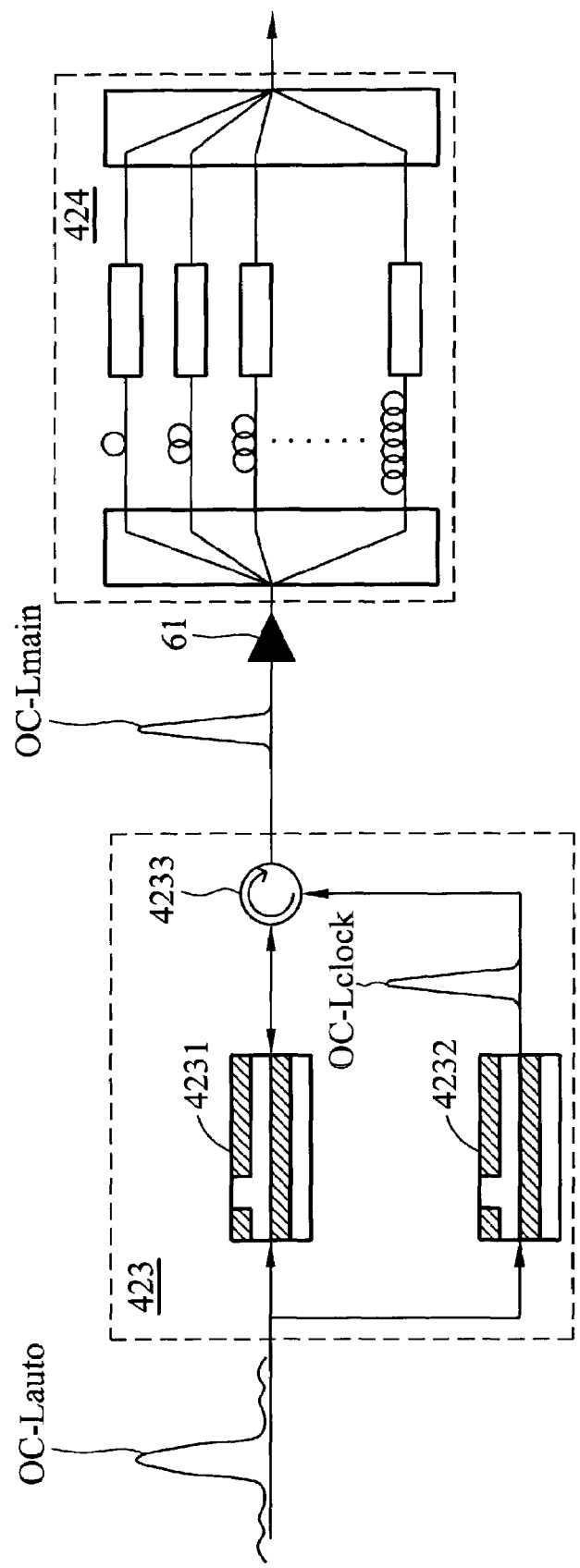
FIG. 6 is a schematic diagram of an auto-correlation optical signal processing and photonic label swapping according to the invention.

FIG. 6 is a flowchart of auto-correlation optical signal processing according to the invention. As shown in FIG. 6, the auto-correlation optical signal OC-Lauto is output through the following optical time gate controller 423, optical amplifier 61 and optical swapper 424. The signal OC-Lauto can be an interpolating function basically represented by sinc (x). The controller 423 can adopt a semiconductor optical device, for example a mode-locked laser diode (MLLD), which is an ultra-fast (10 GHz) optical ultra-short (about 2 ps) pulse generator with low timing jitter (less than 0.5 ps). Inside the controller 423, optical gating is due to absorption saturation and the following picosecond absorption recovery in a saturable absorber in the MLLD structure incorporating optical gate-pulse amplification (not shown). Accordingly, it further includes a gate controller 4231, a clock extractor 4232 and an optical circulator 4233. As shown in FIG. 6, the signal OC-Lauto is sent to the controller 4231 and the extractor 4232. In the extractor 4232, the signal OC-Lauto is coupled with 10GHz monolithic MLLD (i.e. the extractor 4232) in order to obtain synchronized optical clock signal OC-Lclock. The extracted signal OC-Lclock is injected to the circulator 4233 while the signal OC-Lauto is injected to the circulator 4233 through the controller 4231. As such, only an optical data pulse which adequately overlaps with the extracted signal can transmit through the circulator 4233. It means that the signal OC-Lauto can pass through the circulator 4233 only when it has the same timing as the extracted signal OC-Lclock. After the passage of the extracted signal, the controller 423 is recovered to a high absorption state. Also, after the passage of the extracted signal, mainlobe signal OC-Lmain is obtained and amplified by the amplifier 61. The amplified signal is transmitted into the swapper 424 to, as shown in FIG. 4, produce the new photonic label to couple with the original payload as the new optical packet to be output by the switch 43. The swapper can be an optical encoder. Next, an encode example is given.

Figure 7:
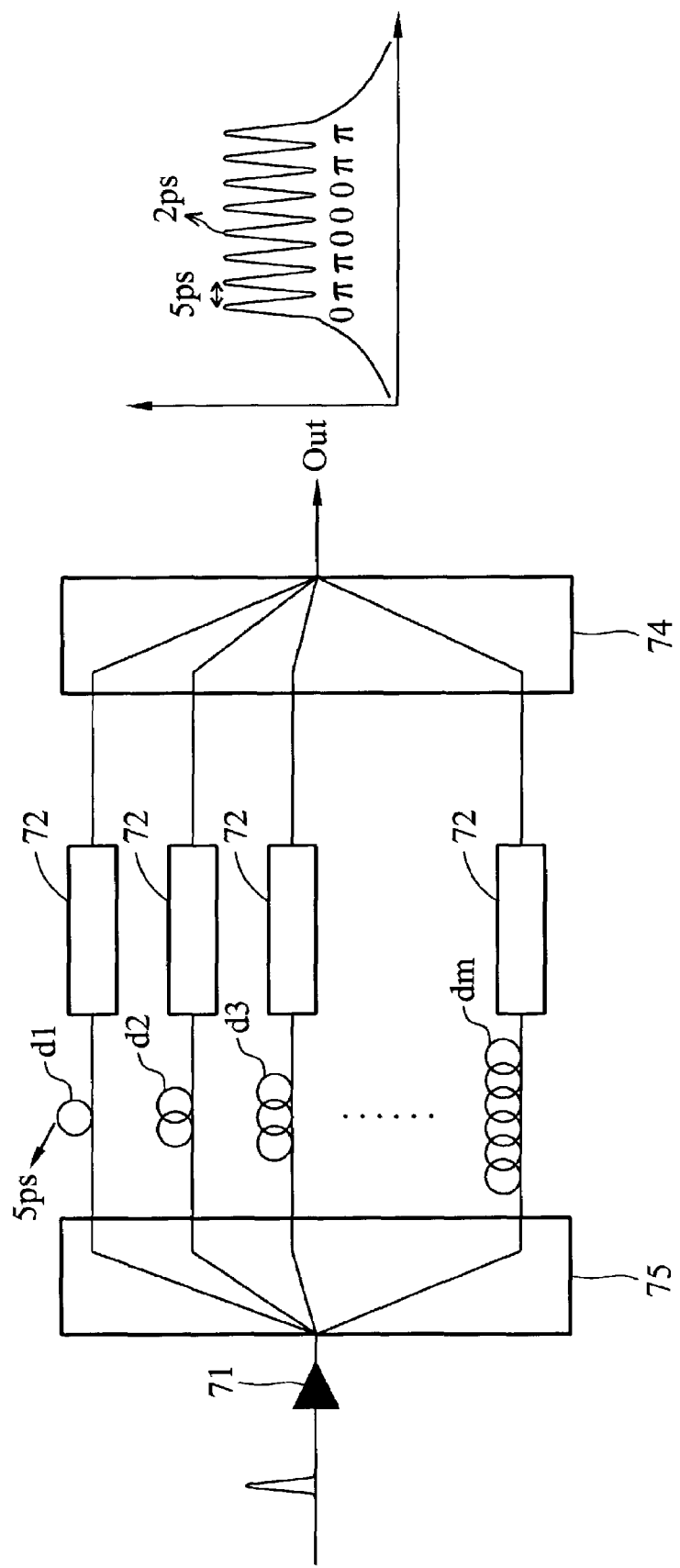
FIG. 7 is schematic diagram of an optical encoder example according to the invention.

FIG. 7 is a schematic diagram of an optical encoder example according to the invention. Due to the same structure of decode and encode except that the impulse response (data processing flow) is reversed in the time domain, only the encoder example is given for simplication and explanation. In FIG. 7, the encoder includes an optical amplifier 71, a plurality of optical fiber delay devices d1-dm and a plurality of phase modulators 72. As shown in FIG. 7, an output of the device 34 in FIG. 3 or the OC-Lmain in FIG. 6 is physically an ultra-short pulse about 2 ps duty duration. The pulse is amplified by an optional amplifier 71, duplicated by an optical splitter 75 (similar to the device 422 in FIG. 5) into multiple copies, passed corresponding delay devices d1-dm to produce different delay time (a circle indicating a chip duration by 5 ps in this example) and modulated by the modulator 72 to produce modulated pulses with a phase shift of π. The modulated pulses are coupled by an optical coupler 72 into the output of the encoder with a stream of optical impulse, for example 0ππ000ππ, to present a new optical code label. Because the new label generally has an ultra-short time duration and is not necessary for photoelectric conversion, the packet processing rate can be raised. The OC-L of FIG. 3 and the devices 415 and 416 of FIG. 4 is similar. In the new label, 0 indicates no shift and π indicates a phase shift of π.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A photonic label switching architecture, which uses an optical code division multiplexing technique to produce photonic labels required by transmitting optical packets, the architecture comprising:

a photonic label extractor having an input terminal, a first output terminal and a second output terminal, to separate a first optical input signal from the input terminal into a first photonic label output to the first output terminal and a payload output to the second output terminal;

a photonic label processing and swapping device having a plurality of optical time gate controllers and a plurality of optical swappers for generating new optical code labels without any control signal and connected to the first output terminal of the photonic label extractor, to produce a plurality of parallel duplicates of the first photonic label and match the duplicates to extract an auto-correlation signal and send the auto-correlation signal into one of the optical time gate controllers to generate an ultra-short pulse signal to one of the optical swappers and thus open a photonic label swapping path to produce a second photonic label different with the first photonic label;

an optical switch connected to the second output terminal of the photonic label extractor and the photonic label processing and swapping device, to couple the second photonic label and the payload as a second optical input signal to be output by a connected output port; and an optical transmitter to produce the first optical input signal having the first photonic label and the payload, wherein the optical transmitter comprises:

a laser diode providing a laser light which is a continuous wave;

an optical splitter connected to the laser diode, to split the laser light emitted by the laser diode into a TE-mode signal and a TM-mode signal;

a first polarization controller connected to the first optical path, to polarize the TE-mode signal;

a first optical modulator connected to the first polarization controller, to modulate the TE-mode signal into an ultra-short optical pulse using ultra-short electrical pulse signal modulation;

an optical encoder connected to the first optical modulator, to encode the ultra-short optical pulse into an optical-coded signal using optical code division multiplexing, thereby producing the first photonic label;

a second polarization controller connected to the second optical path, to polarize the TM-mode signal;

a tunable delay device connected to the second polarization controller, to delay the TM-mode signal as desired;

a second optical modulator connected to the tunable delay device, to combine an external input packet data and the delayed TM-mode signal as the payload; and an optical coupler connected to the second optical modulator and the optical encoder, to couple the payload and the first photonic label as the first optical input signal.

2. The photonic label switching architecture of claim 1, wherein the photonic label extractor comprises a polarization splitter to extract a photonic label from an optical packet.

3. The photonic label switching architecture of claim 2, wherein the polarization splitter is a low-loss polymer waveguide.

4. The photonic label switching architecture of claim 2, wherein the polarization splitter is a briefringent polyimide waveguide.

5. The photonic label switching architecture of claim 1, wherein the photonic label processing and swapping device further comprises:

an optical splitter, to produce the plurality of parallel duplicates of the first photonic label; and a correlator having a plurality of optical decoders connected to the corresponding plurality of parallel duplicates and the optical time gate controllers connected to the corresponding plurality of the optical decoders in order to match the duplicates through the decoders such that only a duplicate of the first photonic label produces the auto-correlation signal to be output and thus opens the photonic label swapping path to output the second photonic label.

6. The photonic label switching architecture of claim 5, wherein each of the optical time gate controllers comprises:

a gate controller, to receive the auto-correlation signal;

a clock extractor, to convert the auto-correlation signal into an ultra-short pulse signal; and an optical circulator, to output the ultra-short pulse signal to the gate controller and thus open the gate controller to transmit a desired signal to the optical swapper connected with the photonic label swapper path.

7. The photonic label switching architecture of claim 6, wherein the gate controller and the clock extractor are a mode-locked laser diode respectively.

8. The photonic label switching architecture of claim 1, wherein the optical switch is formed by a plurality of semiconductor optical amplifiers as optical switching gates controlled by the auto-correlation signal.

9. The photonic label switching architecture of claim 1, wherein the optical transmitter is included in an ingress photonic label switching router.

10. The photonic label switching architecture of claim 1, wherein the optical encoder connects a plurality of parallel delay devices and corresponding phase modulators.

11. The photonic label switching architecture of claim 10, wherein the delay devices have different optical fibers in order to produce different delay time.

12. The photonic label switching architecture of claim 1, wherein the optical swapper is an optical encoder.

13. The photonic label switching architecture of claim 12, wherein the optical encoder connects a plurality of parallel delay devices and corresponding phase modulators.

14. The photonic label switching architecture of claim 13, wherein the delay devices have different optical fibers in order to produce different delay time and the ultra-short pulse is duplicates by a first optical splitter into multiple copies and passed the delay devices to produce first pulses with different timing, the first pulses modulated by the corresponding phase modulators to produce second pulses with different timings and different phase shifts, the second pulses coupled by a optical coupler to produce the second photonic label.

15. A photonic label switching architecture, which uses an optical code division multiplexing technique to produce photonic labels required by transmitting optical packets, the architecture comprising:

an optical transmitter to produce a first optical input signal having a first photonic label and a payload, wherein the optical transmitter comprises:

a laser diode providing a laser light which is a continuous wave;

an optical splitter connected to the laser diode, to equally split the laser light emitted by the laser diode into a TE-mode signal and a TM-mode signal;

a first polarization controller connected to the first optical path, to polarize the TE-mode signal;

a first optical modulator connected to the first polarization controller, to modulate the TE-mode signal into an ultra-short optical pulse using ultra-short electrical pulse signal modulation;

an optical encoder connected to the first optical modulator, to encode the ultra-short optical pulse into an optical-coded signal using optical code division multiplexing, thereby producing the first photonic label;

a second polarization controller connected to the second optical path, to polarize the TM-mode signal;

a tunable delay device connected to the second polarization controller, to delay the TM-mode signal as desired;

a second optical modulator connected to the tunable delay device, to combine an external input packet data and the delayed TM-mode signal as the payload; and an optical coupler connected to the second optical modulator and the optical encoder, to couple the payload and the first photonic label as the first optical input signal.

* * * * *